(12) United States Patent
DiGasbarro et al.

(10) Patent No.: US 8,869,876 B2
(45) Date of Patent: Oct. 28, 2014

(54) HVAC MODULE INTERIOR WALL INSERT

(75) Inventors: Daniel J. DiGasbarro, Oxford, MI (US); Simon Kehimkar, Birmingham, MI (US)

(73) Assignee: DENSO International America, Inc., Southfield, MI (US)

(*) Notice: Subject to any disclaimer, the term of this patent is extended or adjusted under 35 U.S.C. 154(b) by 831 days.

(21) Appl. No.: 12/415,511

(22) Filed: Mar. 31, 2009

(65) Prior Publication Data

US 2010/0243199 A1 Sep. 30, 2010

(51) Int. Cl.
*B60H 1/00* (2006.01)
*B60H 3/00* (2006.01)

(52) U.S. Cl.
CPC .. *B60H 1/00028* (2013.01); *B60H 2001/00092* (2013.01); *Y10S 165/903* (2013.01)
USPC ............ 165/42; 165/43; 165/76; 165/78; 165/903; 165/41; 454/126; 454/160; 454/161; 237/12.3 A

(58) Field of Classification Search
CPC ............... B60H 1/00028; B60H 2001/00092
USPC .......... 165/41–43, 96, 103, 202, 204, 76, 78, 165/903; 454/126, 160, 161, 261–268; 62/244; 29/890.03, 890.035; 237/12.3 A
See application file for complete search history.

(56) References Cited

U.S. PATENT DOCUMENTS

| | | | | |
|---|---|---|---|---|
| 5,109,755 | A * | 5/1992 | Guillemin | 454/160 |
| 5,934,744 | A * | 8/1999 | Jergens et al. | 296/192 |
| 5,967,890 | A * | 10/1999 | Loup et al. | 454/121 |
| 6,106,386 | A * | 8/2000 | Schwarz | 454/143 |
| 6,368,207 | B1 * | 4/2002 | McLaughlin et al. | 454/156 |
| 6,607,029 | B2 * | 8/2003 | Danieau | 165/203 |
| 6,668,909 | B2 * | 12/2003 | Vincent | 165/42 |
| 6,712,283 | B2 * | 3/2004 | Humburg | 237/12.3 C |
| 7,074,122 | B2 * | 7/2006 | Haupt et al. | 454/156 |
| 7,232,367 | B2 * | 6/2007 | Butera et al. | 454/121 |
| 7,475,720 | B2 * | 1/2009 | Kusaka | 165/204 |

(Continued)

FOREIGN PATENT DOCUMENTS

| | | |
|---|---|---|
| DE | 19703519 C1 * | 4/1998 |
| DE | 19834390 C1 * | 8/1999 |

(Continued)

*Primary Examiner* — John Ford
(74) *Attorney, Agent, or Firm* — Harness, Dickey & Pierce, P.L.C.

(57) ABSTRACT

A case for a heating, ventilating and cooling system may include a shell and a plurality of fins. The shell may define an interior volume and may include an air inlet, a first air outlet and a second air outlet. The interior volume may define an airflow path between the air inlet and the first and second air outlets. The shell may be in fluid communication with a blower. The plurality of fins may be disposed in the airflow path between the air inlet and the first and second outlets. The plurality of fins may extend into the interior volume to distribute a first predetermined airflow amount to the first air outlet and a second predetermined airflow amount to the second air outlet.

4 Claims, 5 Drawing Sheets

(56) References Cited

U.S. PATENT DOCUMENTS

| | | | |
|---|---|---|---|
| 2001/0004015 A1* | 6/2001 | Bendell et al. | 165/203 |
| 2002/0157811 A1* | 10/2002 | Vincent | 165/59 |
| 2003/0042011 A1* | 3/2003 | Vincent | 165/203 |
| 2007/0006999 A1* | 1/2007 | Lee | 165/203 |
| 2007/0144727 A1* | 6/2007 | Hirayama et al. | 165/203 |
| 2007/0293134 A1* | 12/2007 | Shimada et al. | 454/121 |
| 2008/0200110 A1* | 8/2008 | Ghosh et al. | 454/160 |
| 2010/0167635 A1* | 7/2010 | Gotoh et al. | 454/121 |

FOREIGN PATENT DOCUMENTS

| | | | |
|---|---|---|---|
| EP | 1445133 | | 3/2007 |
| JP | 59006112 A | * | 1/1984 |
| JP | 63265717 A | * | 11/1988 |
| JP | 06219151 A | * | 8/1994 |
| JP | 2000255255 A | * | 9/2000 |
| JP | 2001085579 A | * | 3/2001 |

* cited by examiner

US 8,869,876 B2

HVAC MODULE INTERIOR WALL INSERT

FIELD

The present disclosure relates to a heating, ventilating and cooling system and more particularly, to a heating, ventilating and cooling module having an interior wall insert or baffle.

BACKGROUND

This section provides background information related to the present disclosure which is not necessarily prior art. Many modern vehicles, such as automobiles, include climate control systems or heating, ventilating and air conditioning (HVAC) systems that operate to heat, ventilate and cool a cabin or passenger compartment of a vehicle. Such vehicles often include a plurality of vents through which air of a desired temperature may flow into the passenger compartment. Typically, a driver and/or passenger may control which of the plurality of vents may deliver the air. For example, the driver and/or passenger may choose to allow air to be delivered into the passenger compartment via one or more of face vents, floor vents and defrost vents. Distribution of air to the one or more vents may affect the vehicle occupants' comfort and enjoyment of the vehicle. The present disclose may provide a module or assembly operable to distribute air to one or more of the face, floor and defrost vents.

SUMMARY

This section provides a general summary of the disclosure, and is not a comprehensive disclosure of its full scope or all of its features. In one form, the present disclosure provides a case for a heating, ventilating and cooling system may include a shell and a plurality of fins. The shell may define an interior volume and may include an air inlet, a first air outlet, a second air outlet and a third air outlet. The interior volume may define an airflow path between the air inlet and the first, second and third air outlets. The shell may be in fluid communication with a blower. The plurality of fins may be disposed in the airflow path between the air inlet and the first and second outlets. The plurality of fins may extend into the interior volume and distribute a first predetermined airflow amount or volume to the first air outlet, a second predetermined airflow amount or volume to the second air outlet, and a third predetermined airflow amount or volume to the third air outlet. A temperatures of the first, second and third predetermined airflow amounts or volumes may be substantially equal to each other.

In another form, the present disclosure provides a heating, ventilating and cooling system including a housing, an evaporator, a heating element, a blower, and a baffle. The housing may define an interior volume and may include a first air inlet, a second air inlet, a first air outlet, a second air outlet and a third air outlet. The interior volume may define an airflow path between the first and second air inlets and the first, second and third air outlets. The evaporator may be in fluid communication with the first air inlet. The heating element may be in fluid communication with the second air inlet. The blower may be in fluid communication with at least one of the evaporator and the heating element. The baffle may be disposed downstream of the first and second air inlets. The baffle may include a plurality of fins extending into the interior volume. The baffle may distribute a first predetermined airflow amount or volume to the first air outlet, a second predetermined airflow amount or volume to the second air outlet, and a third predetermined airflow amount or volume to the third air outlet. Warm air from the first air inlet may be allowed to mix with air from the second air inlet upstream of the baffle.

In yet another form, the present disclosure provides a heating, ventilating and cooling system for a vehicle including a die cast housing, an evaporator, a heating element, a blower, and a baffle. The die cast housing may define an interior volume and may include a first air inlet, a second air inlet, a face vent outlet and a floor vent outlet. The interior volume may define an airflow path between the first and second air inlets and the face, floor and defroster vent outlets. The evaporator may be in fluid communication with the first air inlet. The heating element may be in fluid communication with the second air inlet. The blower may be in fluid communication with at least one of the evaporator and the heating element. The baffle may engage an interior wall of the housing downstream of the first and second air inlets. The baffle may include a plurality of integrally formed fins extending into the interior volume. The baffle may distribute a first predetermined airflow amount or volume to the face vent outlet, a second predetermined airflow amount or volume to the floor vent outlet, and a third predetermined airflow amount or volume to the defroster vent outlet. The plurality of fins may extend in a direction substantially perpendicular to a die pull direction of the housing. At least one of the plurality of fins may be substantially planar and at least one of the plurality of fins may be curved to direct air toward the floor vent outlet or the defroster outlet. Warm air from the first air inlet may be allowed to mix with air from the second air inlet upstream of the baffle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
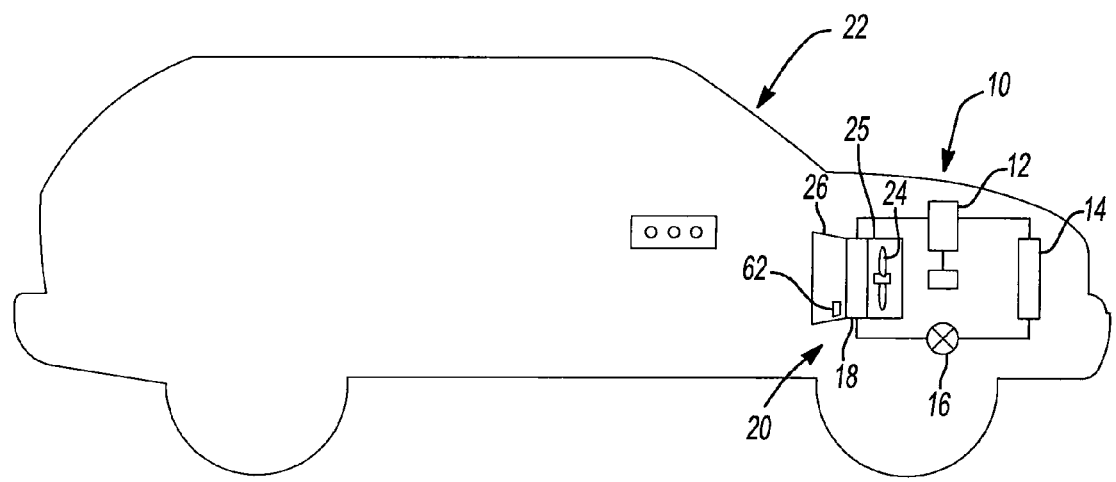
FIG. 1 is a schematic representation of a vehicle having a heating, ventilating and cooling system according to the principles of the present disclosure.
Figure 2:
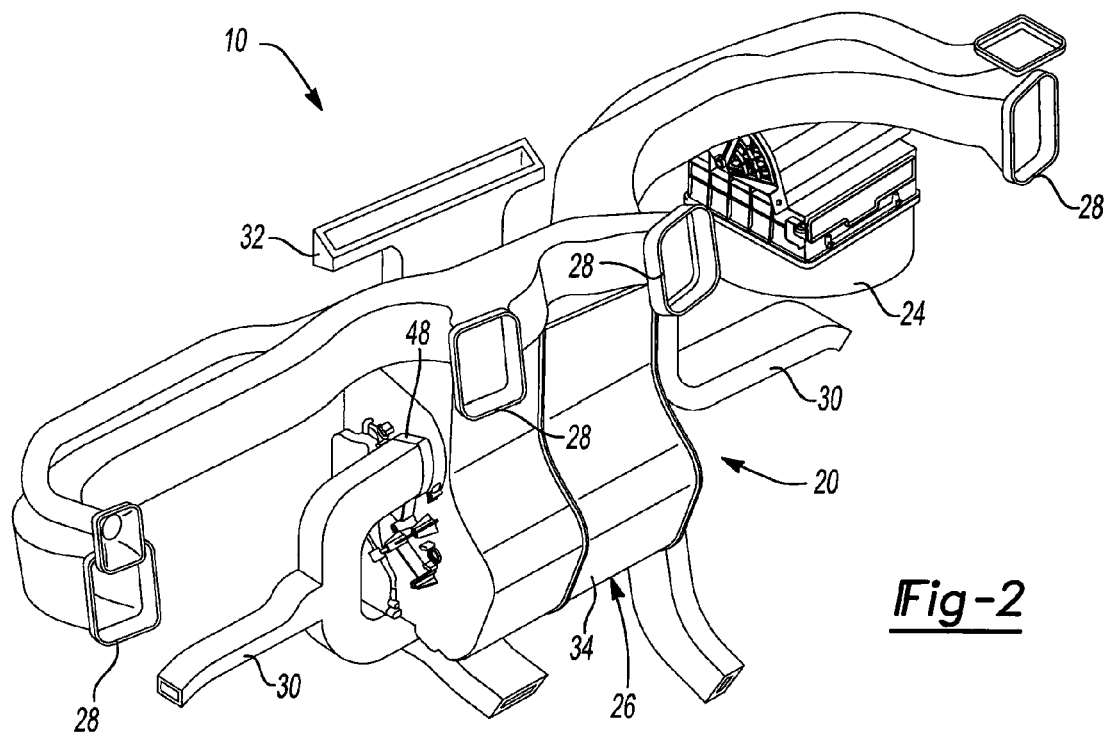
FIG. 2 is a perspective view of an air distribution module of the system of FIG. 1.
Figure 3:
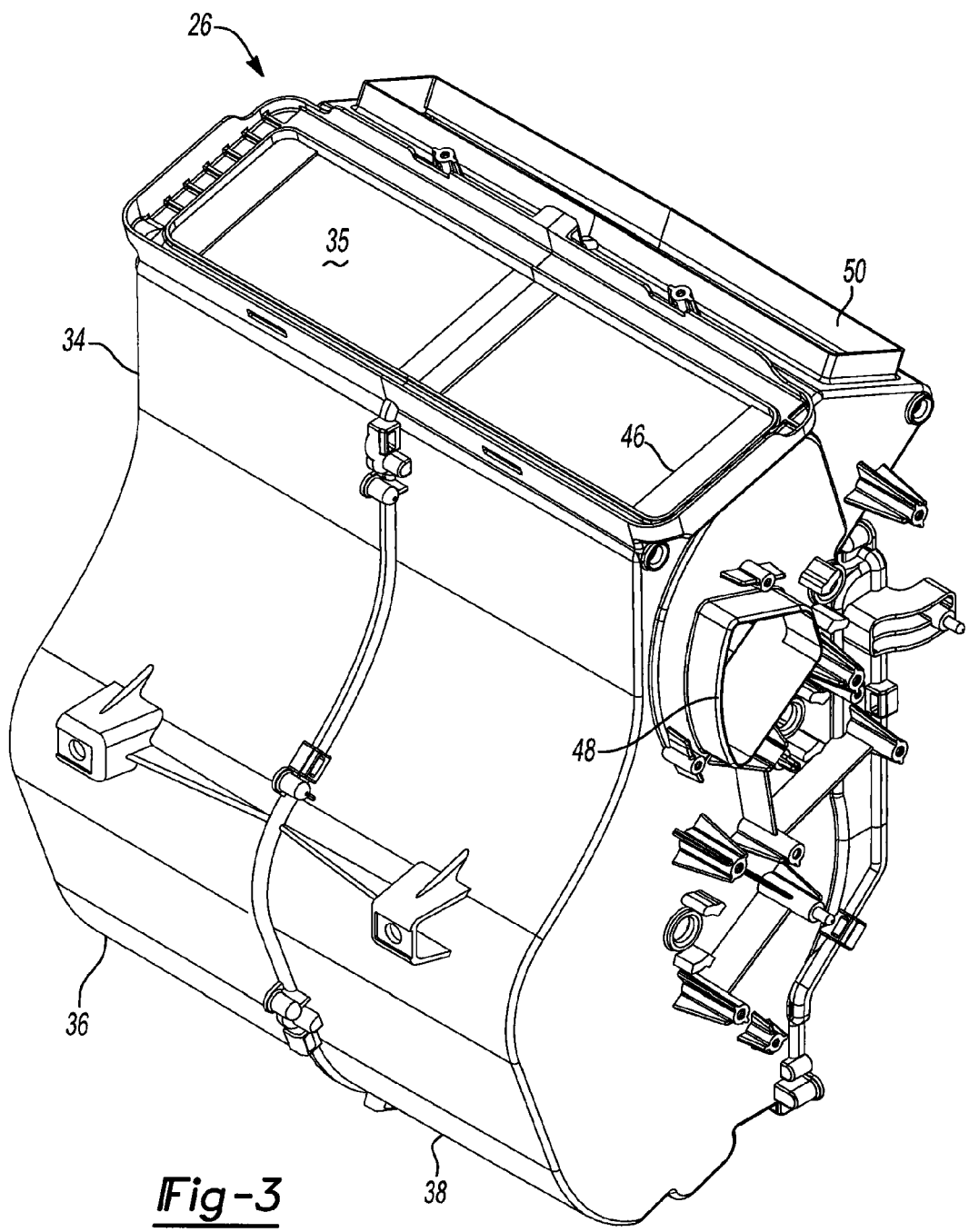
FIG. 3 is a case assembly of the air distribution module of FIG. 2.

Example embodiments will now be described more fully with reference to FIGS. 1-7. A heating, ventilating and air conditioning (HVAC) system 10 is provided and may include a compressor 12, a condenser 14, an expansion device 16, an evaporator 18, and an air distribution assembly 20. The HVAC system 10 may be installed in a vehicle 22 and may be operable to heat, cool or ventilate a cabin or passenger compartment of the vehicle 22.

The compressor 12 may circulate or pump a refrigerant or other fluid through the HVAC system 10. The compressor 12 may draw relatively low pressure fluid, compress the fluid to a relatively higher pressure and discharge the fluid at the relatively high pressure. The compressor 12 can be a reciprocating compressor, a scroll compressor, or a rotary vane compressor, for example, or any other suitable type. The compressor 12 may be driven by an engine or motor of the vehicle 22 via a belt or any other suitable means of transmitting power.

The condenser 14 may include a heat exchanger or coil adapted to receive the high pressure fluid from the compressor 12. The fluid may reject heat to the ambient air as it flows through the coil. It will be appreciated that the condenser 14 could be a gas cooler, a radiator, or any other suitable heat exchanger. The expansion device 16 may be an expansion valve or an orifice tube, for example, adapted to allow the first fluid to expand, thereby lowering the pressure and temperature of the fluid as it flows therethrough. The expansion device 16 may be fluidly coupled with the condenser 14 and evaporator 18.

The evaporator 18 may include a heat exchanger or coil adapted to receive the fluid from the expansion device 16. The fluid may absorb heat from the ambient air as the fluid flows through the coil. A blower 24 may force air through a blower duct 25 and across the coil of the evaporator 18 to facilitate heat transfer therebetween.

The air distribution assembly 20 may include a case 26, one or more face vent ducts 28, one or more foot vent ducts 30, and one or more defrost vent ducts 32. The case 26 may be fluidly coupled with the blower 24 and may receive air that has been forced across the coil of the evaporator 18 by the blower 24. The air may be subsequently distributed from the case 26 to the passenger compartment of the vehicle 22 via one or more of the ducts 28, 30, 32.

The case 26 may include an outer shell 34 defining an interior volume 35. The case 26 may include a first portion 36 and a second portion 38. Each of the first and second portions 36, 38 may be formed as separate pieces from die casting, molding and/or other forming or machining processes. The first and second portions 36, 38 may be subsequently bolted or otherwise fixed together to form a unitary case 26. It will be appreciated, however, that the case 26 could be alternatively formed such that the case 26 may be molded or cast or otherwise formed or machined as a single piece. The case 26 may be formed from a polymeric material and/or a metallic material, for example.

Figure 4:
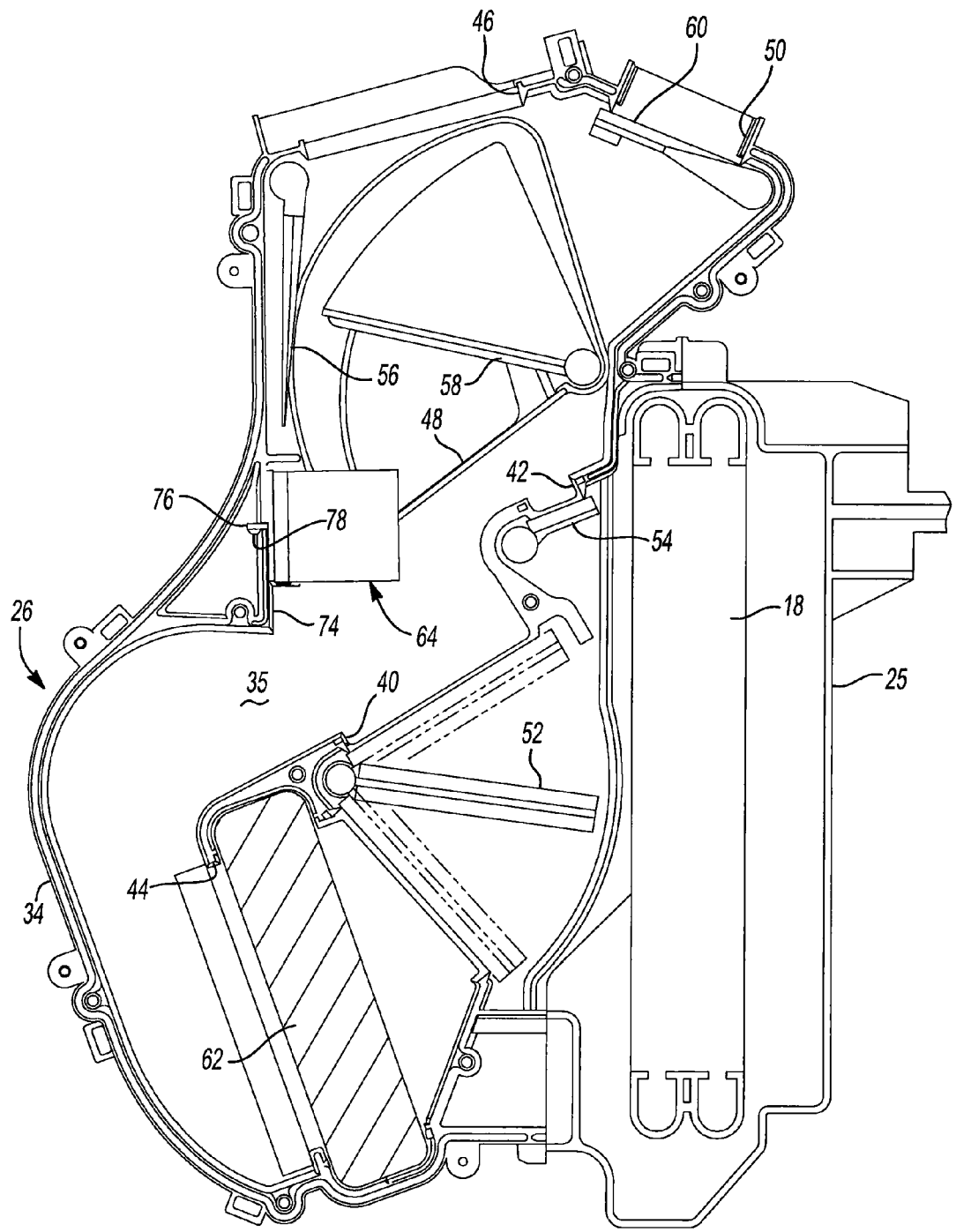
FIG. 4 is a cross-sectional view of the case assembly having a baffle and heater core according to the principles of the present disclosure.
Figure 5:
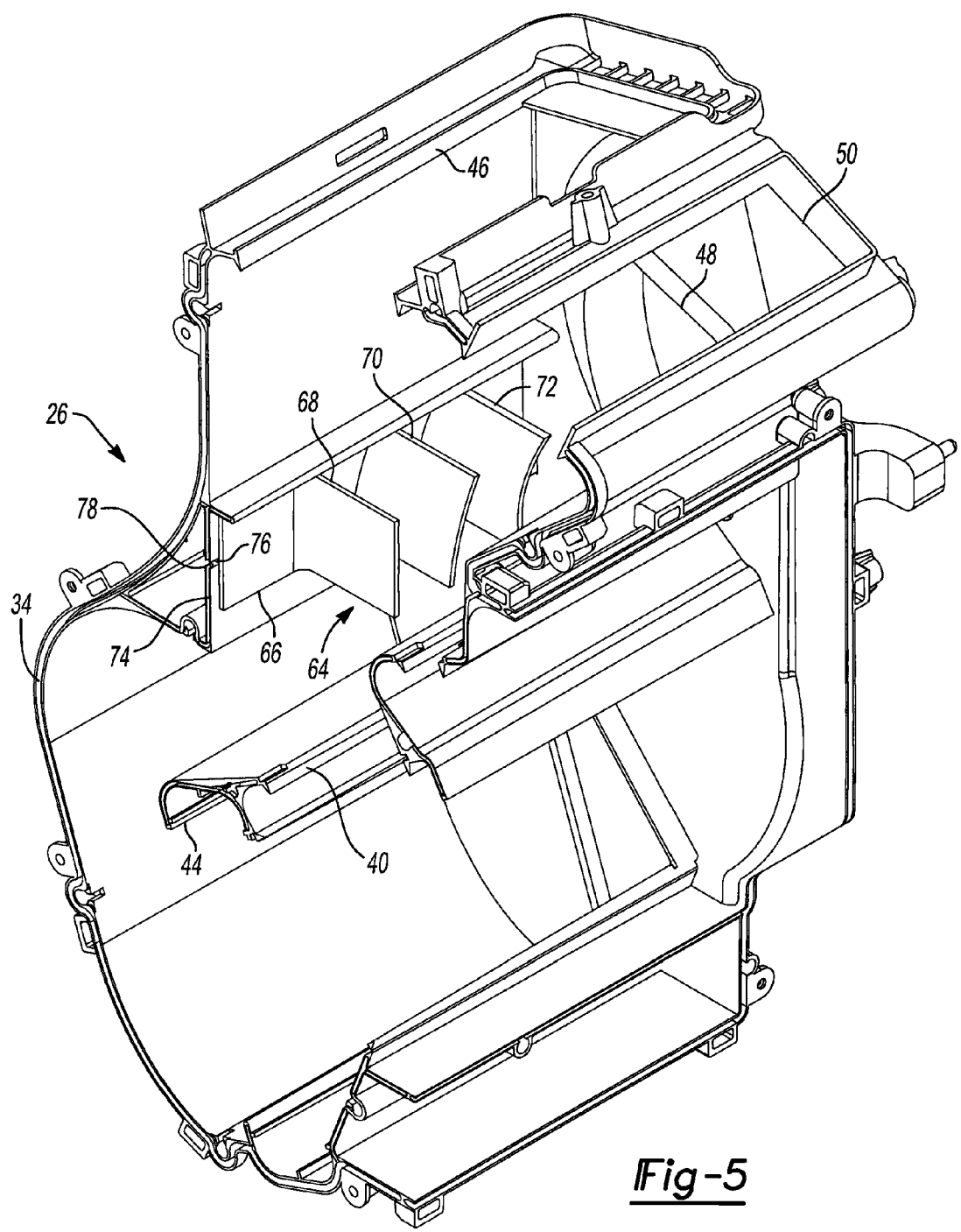
FIG. 5 is a partial perspective view of the case assembly of FIG. 4.

The case 26 may include a first cool air inlet 40, a second cool air inlet 42, a warm air inlet 44, a face vent outlet 46, a foot vent outlet 48, and a defrost vent outlet 50, all of which may be in fluid communication with the interior volume 35. The case 26 may be coupled with the evaporator 18 and the blower duct 25 upstream of the inlets 40, 42, 44 (FIGS. 1 and 4). The face vent outlet 46, foot vent outlet 48 and defrost vent outlet 50 may be fluidly coupled to the face vent ducts 28, foot vent ducts 30 and defrost vent ducts 32, respectively. As shown in FIG. 4, the case 26 may also include first and second temperature control doors 52, 54, a face outlet door 56, a foot outlet door 58 and a defrost outlet door 60, all of which may pivotably engage the outer shell 34 and may be movable between a plurality of positions.

A heater core 62 may be disposed within the case 26 at or proximate to the warm air inlet 44. The heater core 62 may heat air flowing from the blower duct 25 into the interior volume 35 via the warm air inlet 44. The amount of air allowed to flow through the warm air inlet 44 may depend on the position of the first temperature control door 52.

As shown in FIG. 4, the first temperature control door 52 may be selectively movable between a first position (illustrated in phantom lines), a second position (illustrated in phantom lines) and any of a plurality of intermediate positions between the first and second positions. In the first position, the first cool air inlet 40 may be completely blocked and the warm air inlet 44 may be wide-open. In the second position, the warm air inlet 44 may be completely blocked and the first cool air inlet 40 may be wide-open. In any of the intermediate positions, a first portion of the air from the blower duct 25 may flow through the first cool air inlet 40 and a second portion of the air may flow through the warm air inlet 44. It will be appreciated that intermediate positions closer to the first position may allow more air to flow through the warm air inlet 44 than through the first cool air inlet 40. Likewise, intermediate positions closer the second position may allow more air to flow through the first cool air inlet 40 than through the warm air inlet 44. Any air flowing through the warm air inlet 44 will be heated by the heater core 62. Warm air entering the interior volume 35 via the warm air inlet 44 may be allowed to mix with cool air entering the interior volume 35 via the cool air inlet 40 to produce a desired air temperature to be distributed to the passenger compartment of the vehicle.

Additional temperature control (if needed) may be provided by the second temperature control door 54, which may be movable to selectively allow additional cool air to enter the interior volume 35 via the second cool air inlet 42. Vehicle occupants may adjust the positions of the temperature control doors 52, 54 via temperature control buttons, knobs or other control interface, as depicted in FIG. 1, located on or proximate to an instrument panel of the vehicle 22, for example. Additionally or alternatively, an automated temperature control system may actuate the temperature control doors 52, 54.

Referring now to FIGS. 4-7, a wall insert or baffle 64 may be disposed on an inner wall 74 of the outer shell 34. The baffle 64 may include a plate 66, a first fin 68, a second fin 70, and a third fin 72. The baffle 64 may be formed from a polymeric material and/or a metallic material, for example, and may be formed from a die casting, molding, and/or other forming or machining processes. The plate 66 may be attached to an inner wall 74 of the case 26. The plate 66 may include a member 76 which may engage a slot 78 formed in the inner wall 74 to form a tongue and groove connection, for example. Additionally or alternatively, the plate 66 may be clipped, bolted, bonded, interference or press fit, or otherwise suitably fixed to the case 26 or integrally formed therewith.

Figure 7:
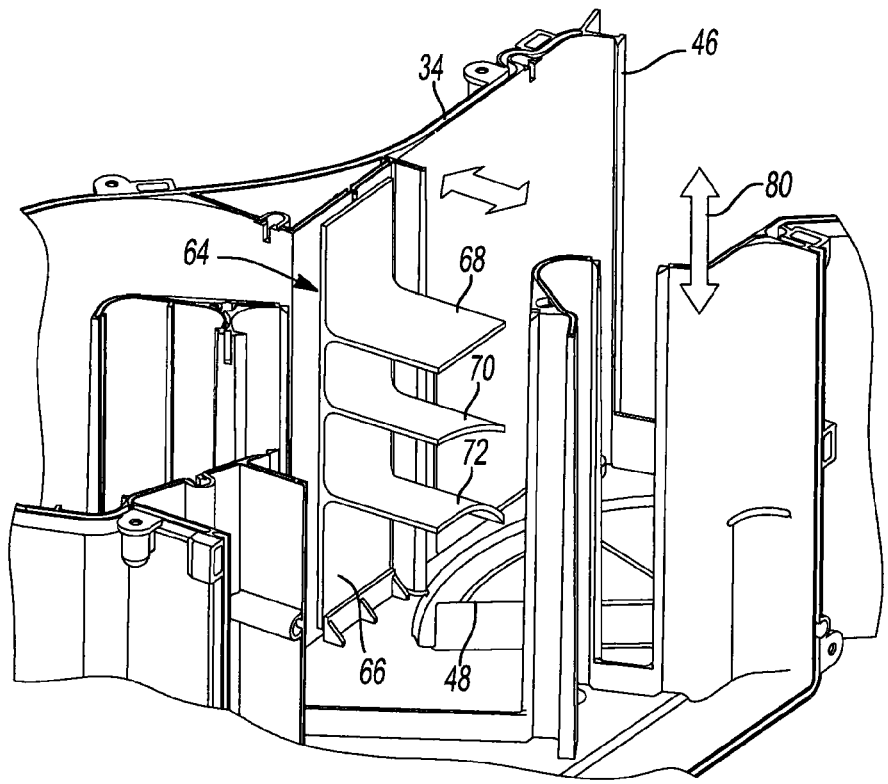
FIG. 7 is partial perspective view of the case assembly, including depiction of die-pull arrows, according to the principles of the present disclosure.

The fins 68, 70, 72 may be integrally formed with the plate 66 and may extend therefrom into the interior volume 35 of the case 26. As shown in FIG. 7, the fins 68, 70, 72 may extend substantially perpendicular to a die pull direction of the case 26. In FIG. 7, the die pull direction is indicated by an arrow 80. It will be appreciated that the fins 68, 70, 72 could extend at any suitable angle relative to the die pull direction of the case 26.

The first fin 68 may be generally planar and may be substantially perpendicular to the plate 66. The second fin 70 may be disposed between the first fin 68 and the third fin 72. The second fin 70 may be sloped, curved and/or angled toward the foot vent outlet 48. The third fin 72 may also be sloped, curved and/or angled toward the foot vent outlet 48, however, the third fin 72 may include a smaller radius of curvature than the second fin 70 and/or may be disposed at a larger angle relative to the first fin 68 than the second fin 70. While the second and third fins 70, 72 are described above as being curved and including a radius of curvature, the second and third fins 70, 72 could include a substantially flat portion and/or a plurality of radii of curvature. While the first fin 68 is described above as being substantially flat and perpendicular to the plate 66, the first fin 68 could include a sloped, curved and/or angled portion. Moreover, any of fins 68, 70, 72 may include a sloped, curved and/or angled portion.

Figure 6:
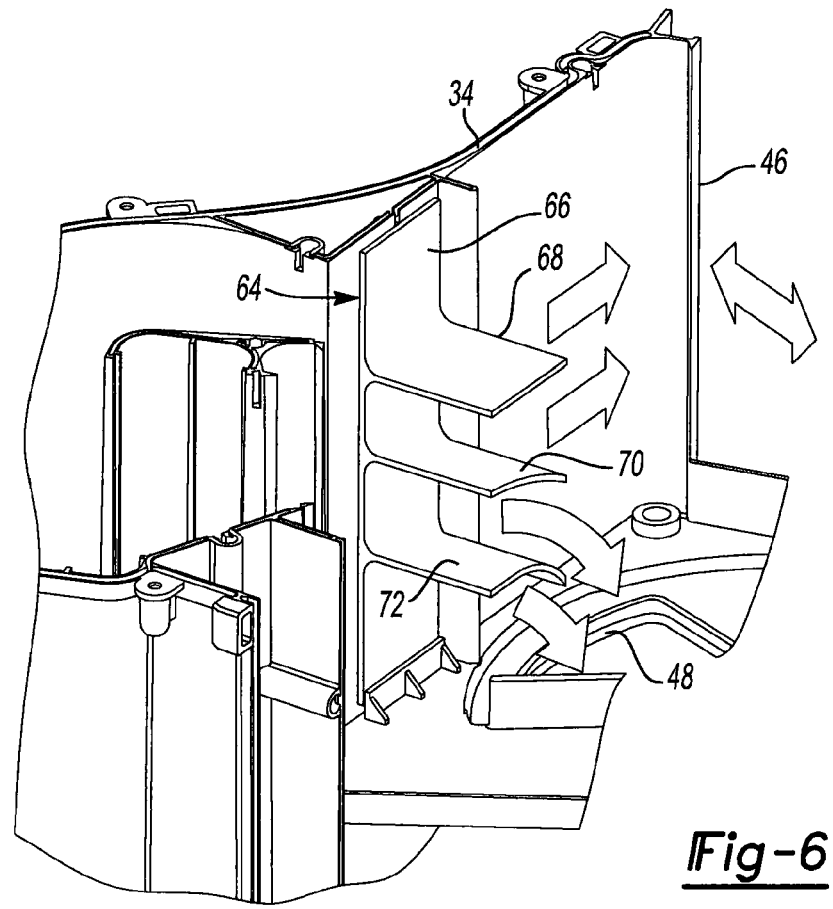
FIG. 6 is a partial perspective view of the baffle installed in the case assembly.

In the particular embodiment illustrated in FIGS. 4-7, the baffle 64 may be located proximate to and upstream of the foot vent outlet 48 and downstream of the first cool air inlet 40 and the warm air inlet 44. Any warm air from the warm air inlet 44 may at least partially mix or blend with any cool air from the first cool air inlet 40 upstream of the baffle 64. The first fin 68 may bias at least a portion of the airflow through the case 26 past the foot vent outlet 48 and toward the face vent outlet 46 (FIG. 6). The second and third fins 70, 72 may bias at least portions of the airflow through the case 26 toward the foot vent outlet 48 (FIG. 6). In this manner, the baffle 64 may tune the airflow through the case 26 to produce a desired distribution of airflow to the face vent duct 28 and a desired distribution of airflow to the foot vent duct 30. For example, in a bi-level mode, where it may be desirable for a substantially equal amount of air to enter the passenger compartment of the vehicle 22 via the face vent ducts 28 and the foot vent ducts 30, the distribution of airflow quantity between the face vent outlet 46, the foot vent outlet 48 and/or defroster outlet 50 may be achieved more uniformly.

It will be appreciated that the fins 68, 70, 72 may be otherwise suitably formed, shaped, relatively oriented and/or located. Further, the baffle 64 could include any number of fins. The shapes of the fins, the number of fins and their orientations relative to the face vent outlet 46, the foot vent outlet 48 and the defroster vent outlet 50 may determine the relative distribution of air that flows into the face vent duct 28, the foot vent duct 30, and defroster vent duct 32, respectively. The precise number, shape, size, orientation and location of the fins may be dependent upon the relative locations of the face and foot vent outlets 46, 48, the design and geometry of the case 26, the airflow characteristics through the case 26 and/or other factors. Accordingly, the shape, size, orientation and location of the baffle 64 and fins 68, 70, 72 may be determined through testing, computer aided engineering (CAE) software, and/or other modeling and optimization tools and methods.

It will be appreciated that multiple baffles 64 could be disposed within a single case 26. Additionally or alternatively, the baffle 64 may be formed and located within the case 26 to tune the airflow quantity between foot vent outlet 48 and the defrost vent outlet 50 or between any other two or more outlets. Each portion 36, 38 (FIG. 3) of the case 26 may include a corresponding one or more baffles 64.

Additionally or alternatively, the air distribution assembly 20 could include two or more separate cases 26, each including one or more baffles 64. For example, the vehicle 22 may include a dual or multiple zone climate control system, where a driver and one or more passengers may adjust temperature settings and/or airflow quantity settings for a localized zone within the passenger compartment of the vehicle 22. In such an embodiment, each of the cases 26 may correspond to one of the multiple localized zones within the vehicle 22.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence, order, or quantity unless clearly indicated by the context. Thus, a first element, component, region, layer or section discussed herein could be termed a second element, component, region, layer or section without departing from the teachings of the example embodiments.

What is claimed is:

1. A heating, ventilating and cooling system for a vehicle comprising:

a die cast housing defining an interior volume and including a first air inlet, a second air inlet, a face vent outlet and a floor vent outlet different than the face vent outlet, the interior volume defining an airflow path between the first and second air inlets and the face and floor vent outlets;

an evaporator in fluid communication with the first air inlet;

a heating element in fluid communication with the second air inlet;

a blower in fluid communication with at least one of the evaporator and the heating element; and a stationary baffle engaging an interior wall of the housing downstream of the first and second air inlets, the baffle including a plurality of integrally formed stationary fins extending into the interior volume and simultaneously distributing a first predetermined airflow volume greater than zero to the face vent outlet and a second predetermined airflow volume greater than zero to the floor vent outlet, the plurality of stationary fins extend in a direction substantially perpendicular to a die pull direction of the housing, the plurality of fins progressively decreasing an amount of the first predetermined airflow volume to the first air outlet and progressively increasing an amount of the second predetermined airflow volume to the second air outlet between a first end of the plurality of fins and a second end of the plurality of fins opposite to the first end, wherein at least one of the plurality of stationary fins is substantially planar and at least one of the plurality of stationary fins is curved to direct air toward the floor vent outlet, wherein warm air from the first air inlet is allowed to mix with air from the second air inlet upstream of the baffle.

2. The system of claim 1, wherein the housing includes a plurality of doors, wherein each of the plurality of doors is operable to selectively allow and prevent airflow through at least one of the first air inlet, the second air inlet, the face vent outlet, and the floor vent outlet.

3. The system of claim 1, wherein the second air outlet extends in a direction generally perpendicular to the first air outlet.

4. The system of claim 1, wherein the air inlet includes a warm air inlet and a cool air inlet, air from the warm air inlet mixing with air from the cold air inlet mixing with air from the cold air inlet prior to being simultaneously distributed by the plurality of stationary fins.

* * * * *

UNITED STATES PATENT AND TRADEMARK OFFICE
CERTIFICATE OF CORRECTION

PATENT NO.       : 8,869,876 B2  
APPLICATION NO.  : 12/415511  
DATED            : October 28, 2014  
INVENTOR(S)      : DiGasbarro et al.

Page 1 of 1

It is certified that error appears in the above-identified patent and that said Letters Patent is hereby corrected as shown below:

In the Claims

Col. 7, lines 17-18, Claim 4, after "inlet", delete "mixing with air from the cold air inlet".

Signed and Sealed this  
Third Day of March, 2015

Michelle K. Lee  
*Deputy Director of the United States Patent and Trademark Office*